US011047359B2

(12) United States Patent
Che (10) Patent No.: US 11,047,359 B2
(45) Date of Patent: Jun. 29, 2021

(54) GRAVITATIONAL TURBINE ENGINE (71) Applicant: Yanjun Che, Niagara Falls (CA)

(72) Inventor: Yanjun Che, Niagara Falls (CA)

( * ) Notice: Subject to any disclaimer, the term of this patent is extended or adjusted under 35 U.S.C. 154(b) by 0 days.

(21) Appl. No.: 16/384,875

(22) Filed: Apr. 15, 2019

(65) Prior Publication Data

US 2019/0316560 A1 Oct. 17, 2019

Related U.S. Application Data

(60) Provisional application No. 62/658,797, filed on Apr. 17, 2018.

(51) Int. Cl.
*F03B 3/12* (2006.01)
*F03B 17/00* (2006.01)
*F03B 13/10* (2006.01)
*F03B 17/04* (2006.01)

(52) U.S. Cl.
CPC .............. *F03B 3/12* (2013.01); *F03B 13/10* (2013.01); *F03B 17/00* (2013.01); *F03B 17/04* (2013.01); *Y02E 10/20* (2013.01)

(58) Field of Classification Search
CPC .. F03B 3/12; F03B 17/00; F03B 13/10; F03B 17/04; Y02E 10/20; Y02E 10/74; F03D 3/005
See application file for complete search history.

(56) References Cited

U.S. PATENT DOCUMENTS

| 8,981,582 | B2 * | 3/2015 | Grossman | F03B 17/04 290/1 R |
|---|---|---|---|---|
| 2006/0288698 | A1 * | 12/2006 | Dentler | F03B 17/04 60/504 |
| 2010/0223922 | A1 * | 9/2010 | McGahee | F03B 17/04 60/495 |
| 2015/0020518 | A1 * | 1/2015 | Manoj | F03B 17/04 60/495 |
| 2016/0146179 | A1 * | 5/2016 | Che | F03B 15/06 290/1 R |
| 2016/0215753 | A1 * | 7/2016 | Westmoreland | F03B 17/04 |

* cited by examiner

*Primary Examiner* — Michael C Zarroli (57) ABSTRACT

A method for obtaining fluid gravitational potential energy and buoyant potential energy by utilizing an internal space of a rotor on turbine engine is provided. The method includes allowing fluid to act on the outer space of the rotor to form a reciprocating power with the interior of the rotor through utilizing a spatial structure of the rotor. The method further includes the rotor on the turbine obtaining a rotational torque of the turbine engine in response to fluid transient action at the desired location.

6 Claims, 14 Drawing Sheets

GRAVITATIONAL TURBINE ENGINE

The present application claims priority to the earlier filed provisional application having Ser. No. 62/658,797, and hereby incorporates subject matter of the provisional application in its entirety.

BACKGROUND

The present invention relates to a kind of renewable energy, and, in particularly, to a turbine for obtaining energy from a static fluid. The use of kinetic energy for water generation is a common way to obtain clean electricity, but it is subject to natural conditions and requires flowing water resources. U.S. patent application Ser. No. 14/252,778, indicates a method of object that losses buoyancy for extracting gravitational field energy using static fluid. The fluid contains unlimited gravitational field energy anywhere. Therefore, converting the static fluid energy on the earth into electricity can turn buildings and communities into a green power plant, allowing anyone to produce their own green energy in their homes, offices and factories.

A turbine is a rotary mechanical device that extracts energy from a fluid flow and converts it into useful work. The work produced by a turbine can be used for generating electrical power when combined with a generator. A turbine is a turbomachine with at least one moving part called a rotor assembly, which is a shaft or drum with blades attached. Moving fluid acts on the blades so that they move and impart rotational energy to the rotor. For example, a fan blade with a central axis, which is placed in a fluid (such as air or water), the asymmetric force exerted on the blade when the fluid passes will drive the entire rotor to start rotating, thereby allowing the axial torque to be output from the central axis.

Therefore, there is a need for an improved turbine that utilizes the pressure in the static fluid to apply an asymmetrical force to the rotor to obtain a difference in gravity or buoyancy that is obtained by the entire rotor, and the torque generated by the difference in gravity or buoyancy drives the entire rotor to begin to rotate and increase the output power at the same time.

BRIEF DESCRIPTION

Briefly, in accordance with one aspect of the present invention, a method is provided for obtaining fluid gravitational potential energy and buoyant potential energy by utilizing an internal space of a rotor on turbine engine. The method includes allowing a fluid to act on the outer space of the rotor to form a reciprocating power with the interior of the rotor through utilizing a spatial structure of rotor. The method further includes the rotor on the turbine obtaining a rotational torque of the turbine engine in response to fluid transient action at a desired location. The method further includes increasing turbine engine power based upon shielding hydrostatic pressure and increasing fluid depth. The method further includes reducing friction between the shielding device and the rotor based upon the use of rolling elements or lubricating sealing materials. The method further includes obtaining a fluid power based on a rotor on the turbine engine and the support-guideway system and the rolling member. The method further includes obtaining a fluid pressure in a horizontal direction based upon a sectional shape of the rotor on the turbine engine.

In another aspect, the present invention provides a static pressure turbine engine having a rotor with an air space structure inside, a number of shafts and bearings can be mounted on the outside of the rotor to correspond to the support-guideway system; a plurality of objects installed in the inner space of the rotor or fluid chambers installed for loading the fluid, the rotor is drivingly connected to the generator. The static pressure turbine engine comprises a shielding fluid device to shield fluid pressure at a desired location of the static pressure turbine engine in a certain direction. The shielding fluid device further includes ball transfer units or pulley or a self-lubricating sealing material, the shielding device is configured at the location where obtains the fluid pressure or the gravity of the object based upon the rotor in a certain direction to drive the turbine fluid power generator rotation. Several small shafts and bearings can be mounted on the outside of the rotor to correspond to the guide rails.

DRAWINGS

These and other features, aspects and advantages of the present invention will become better understood when the following detailed descriptions are read with reference to the accompanying drawings, where the same symbols in the accompanying drawings represent the same parts throughout the accompanying drawings, wherein.

DETAILED DESCRIPTION

The following description presents a novel technique for a turbine engine and increased power output in a static fluid environment, such as, creating a novel rotor with air structure inside in which objects are placed to gain a potential energy, and the rotor can convert the potential energy of object and fluid into kinetic energy by shielding fluid action based on axisymmetric asymmetry so as to drive the turbine engine. Embodiments of the present technology provide a sensing fluid pressure methodology for a rotor and an internal object that uses a shielding device and a spatial structure of the rotor to obtain driving force generated by the static fluid. Embodiments of the present technology provide a shielding device capable of achieving a reduction-resistance shielding effect by using a rolling member, a sealing member, and a lubricating grease when the shielding device is in close contact with a moving member to shield fluid pressure. FIG. 1-14.

Figure 1:
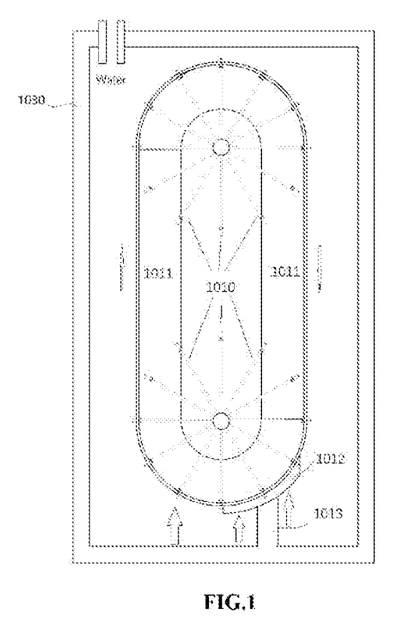
FIG. 1 illustrates a vertically mounted turbine engine in accordance with aspects of the present technique.

Turning now to the drawings, FIG. 1 illustrates a vertically mounted turbine engine in accordance with aspects of the present technique. The turbine engine comprises a support-guideway system having two of radial axis vertically mounted on container 1030 filled with water. The support-guideway system is drivingly connected to an electrical generator (not shown). The turbine engine further comprises the rotors 1011 mounted on radial axis 1010, the rotors 1011 having holes fitted with the radial axis 1010 that allows the rotor 1011 to rotate on the guideway system.

The turbine engine further comprises a bracket 1013 mounted on the container and a shielding device 1012 mounted on top of the bracket 1013. The shielding device 1012 is mounted on the right side of the radial axis 1010 and in close contact with the lower surface of the rotor 1011 to shield the upward water pressure at this position. The rotor 1011 on the other side of the radial axis 1010 is subjected to upward pressure of water (arrow indicated).

Figure 2:
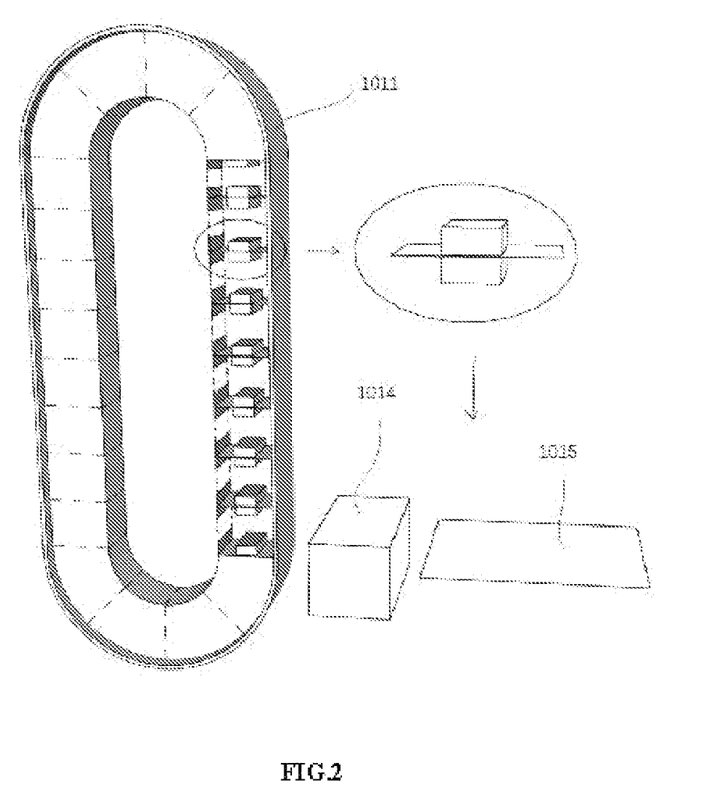
FIG. 2 illustrates a schematic diagram of an internal spatial mechanism for realizing a rotor induced fluid pressure in accordance with aspects of the present technology.

FIG. 2 illustrates a schematic diagram of an internal space for realizing a rotor induced fluid pressure in accordance with aspects of the present technology. FIG. 2 illustrates the rotor 1011 is in the shape of an annular belt with air inside. The interior of the rotor 1011 further comprises a plurality of support frames 1015 and a plurality of objects 1014 (not all shown) thereon.

The container filled with water, the turbine engine under hydrostatic pressure: on the left side, the rotor 1011 and the object 1014 on this side are subjected to buoyancy, the total gravity of the object 1014 is reduced by the upward pressure; the shielding device 1012 shields the buoyancy that the rotor 1011 is subject to at this position, and the total gravity of the rotor 1011 and the object 1014 is the same as in the air, therefore, the total gravity does not decrease; at this point, all the objects 1014 on the two sides generate a gravity difference (buoyancy difference) around the radial axis 1010, and the gravity difference is converted into a rotational torque around the radial axis 1010, and the rotor 1011 begins to move under the driving of the rotational torque, which is further transformed into electrical energy via an electrical generator.

Figure 3:
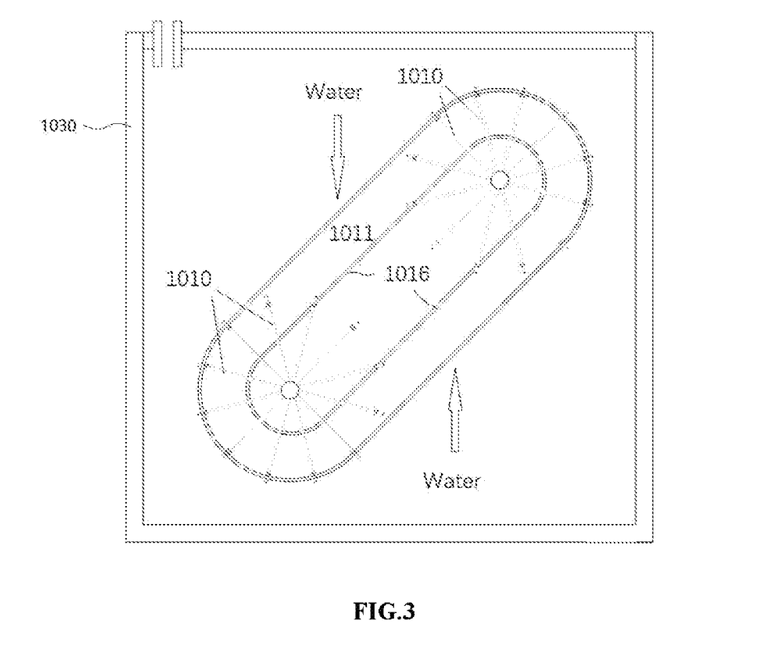
FIG. 3 illustrates a tilted-mounted turbine engine in accordance with aspects of the present technique.

FIG. 3 illustrates a tilted-mounted turbine engine in accordance with aspects of the present technique. The turbine engine comprises a support-guideway system having two of radial axis 1010 aslant mounted on container filled with water. The turbine engine further comprises the rotor 1011 that is in the shape of an annular belt with air inside. The rotor 1011 further comprises a plurality of support frames 1015 and a plurality of objects 1014 (not all shown) thereon. The turbine engine further comprises a support-shield track 1016. 1030 is the container.

Figure 4:
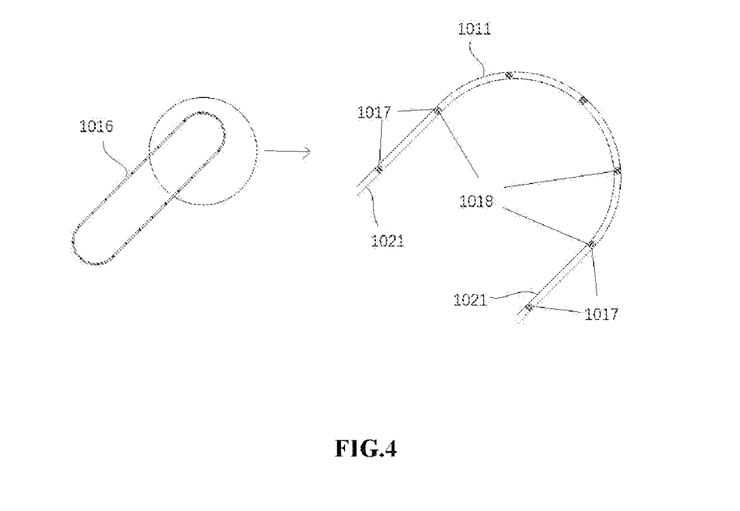
FIG. 4 is a schematic diagram illustrating a support shield track of FIG. 3.

FIG. 4 is a schematic diagram illustrating a support-shield track as illustrated in FIG. 3. In the illustrated embodiment, the support-shield track is configured as an annular surface bracket 1021 to act as a moving track for the bearing 1018. The support-shielding track 1016 further comprises a shielding device mounted on both side end faces of the rotor 1011 (not shown) to construct an air space with the annular bracket 1021. The bearings 1018 are mounted at both ends of the shaft 1017.

The container filled with water, the turbine engine under hydrostatic pressure: due to the action of the support-shield track 1016, the rotor 1011 and the plurality of objects 1014 located under the annular support 1021 are subjected to buoyancy, and the total gravity is reduced; the plurality of objects 1014 located in the rotor 1011 above the annular support 1021 are not subjected to buoyancy, and the total gravity is the same as in the air, and is not reduced; in this case, all objects 1014 on both sides will be caused to surround the radiation axis 1010, always producing a gravity difference (buoyance difference), which is converted around the radiation axis 1010 into a rotating torque.

Figure 5:
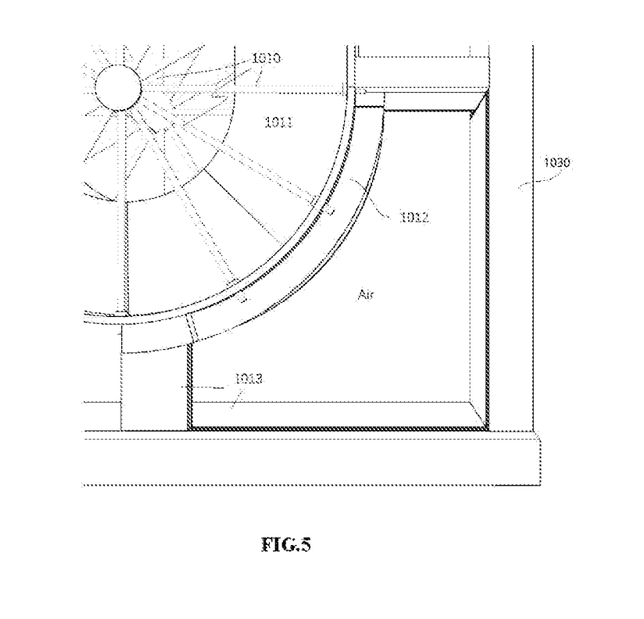
FIG. 5 is a schematic diagram illustrating a shielding method variation during shielding a fluid, in accordance with aspects of the present technique.

FIG. 5 is a schematic diagram illustrating a variation of shielding method during shielding a fluid, in accordance with aspects of the present technique. In certain embodiments, the shielding device 1012 is configured to be mounted on the bracket 1013 using a gas permeable, water impermeable material that will prevent the rotor 1011 at the shielding device from being subjected to buoyancy. 1030 is the container.

Figure 6:
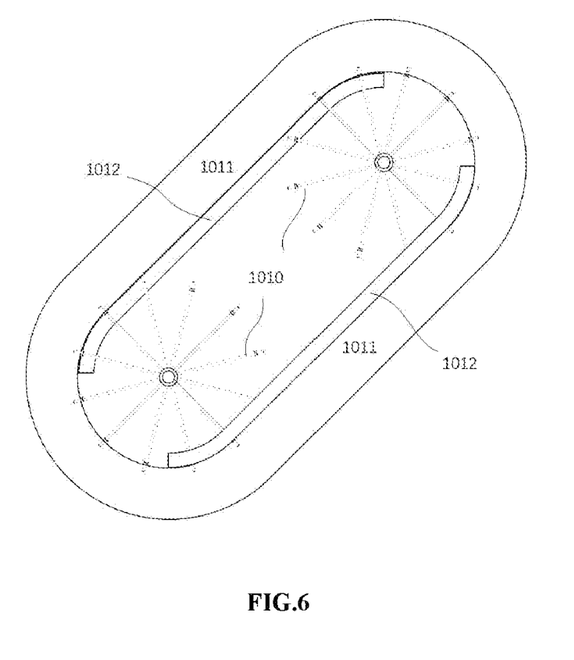
FIG. 6 illustrates a schematic diagram of improving output power of a turbine engine in accordance with aspects of the present technology.

FIG. 6 illustrates a schematic diagram of improving output power of a turbine engine in accordance with aspects of the present technology. In certain embodiments, the turbine engine is configured with the shielding devices 1012 on upper and lower of the inner ring surface of the rotor 1011 for shielding fluid pressure. The two shielding devices 1012 are fixedly mounted on the container so that the fluid can only act in one direction on the inclined section or the lower surface of the rotor 1011, and the effect is to increase the potential energy of the rotor 1011 located in the section to improve the turbine engine outputs power.

Figure 7:
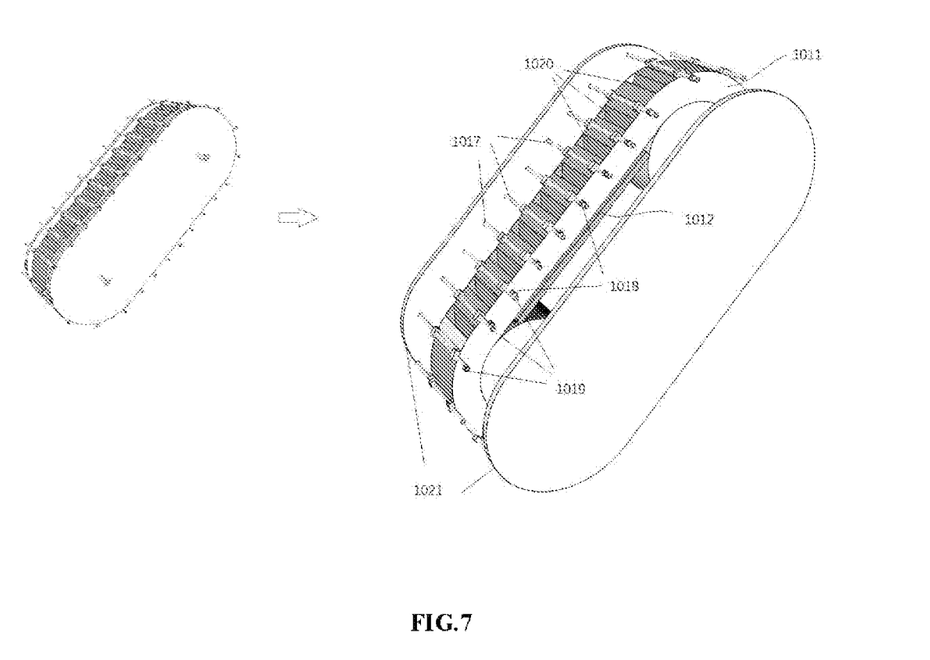
FIG. 7 is a schematic diagram illustrating a turbine engine with an opening on the outer surface of a rotor in accordance with aspects of the present technology.
Figure 8:
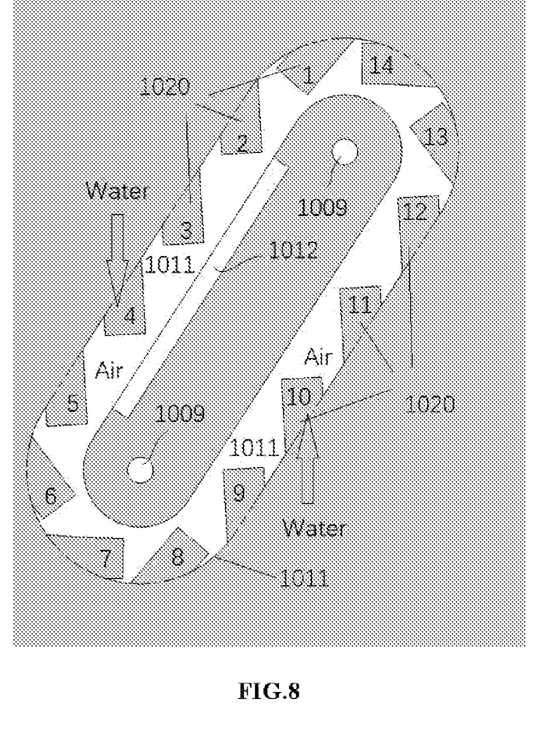
FIG. 8 illustrates a schematic diagram of the fluid pressure induced by the rotor fluid chamber in a static fluid in accordance with aspects of the present technology in FIG. 7.

FIG. 7 is a schematic diagram illustrating a turbine engine with an opening on the outer surface of a rotor in accordance with aspects of the present technology. In certain embodiments, the turbine engine comprises a rotor 1011 with an opening on the surface and a plurality of fluid chambers 1020 are installed inside the rotor 1011. The surface of the rotor 1011 comprises shaft 1017 and bearings 1018 and 1019. The turbine engine further comprises a support-guideway system 1021 and a shielding device 1012. Wherein the bearing 1018 is rotated on the support-guideway system 1021. FIG. 8 is a graphical representation of the induced fluid pressure of the rotor fluid chamber in a static fluid in accordance with aspects of the present technology.

FIG. 8 illustrates a schematic diagram of the fluid pressure induced by the rotor fluid chamber in a static fluid in accordance with aspects of the present technology in FIG. 7. As shown, water enters all of the fluid chambers 1020 through the rotor 1011:

The fluid chamber 1020 (1, 2, 3, 4, 5, 6) is located above the shielding device: since the rotor 1011 at this position is not subjected to the upward pressure of water, the water and the fluid chambers 1020 have gravitational potential energy with respect to the bottom of the rotor, and the gravity of the water and fluid chamber 1020 generates a gravitational torque based on the shaft 1009; the water begins to move downwards;

Fluid chamber 1020 (8, 9, 10, 11, 12, 13): since the rotor 1011 at this position is subjected to upward pressure of water, these fluid chambers 1020 are subjected to buoyancy, and thus the gravity of these fluid chambers 1020 is reduced, and the fluid is based on the shaft 1009 generates a buoyancy torque (the buoyancy potential energy is generated when the fluid chamber 1020 is a floating body); the water begins to move upwards;

Therefore, the gravity torque and buoyancy torque of the fluid will be converted into rotational torque based on the shaft 1009 to drive the turbine engine to start rotating output;

$$\Sigma W = \Sigma W \text{ left} - (-\Sigma W \text{ right}) = (\Delta P \text{ down} \times \Delta h) - (-\Delta P \text{ Up} \times \Delta h) = (\Delta P \text{ down} + \Delta P \text{ up}) \times \Delta h.$$

Where P is the fluid pressure and h is the height of the relative axis of the fluid chamber.

It is, therefore, to be understood that the power of the turbine engine, ie the potential energy, is proportional to the depth of the fluid and to the spatial height of the rotor. With the turbine engine in the same volume, installing the turbine engine at the bottom of the container and increasing the height of the fluid can increase the power of the output.

It is, therefore, to be understood that the interaction of the fluid in the outer space of the rotor and the interior of the rotor produces reciprocating power while the fluid chamber is self-driven to circulate up and down.

It is, therefore, to be understood that the cross-sectional shape of the rotor is trapezoidal/triangular/arc shaped to effectively utilize the horizontal fluid pressure.

Figure 9:
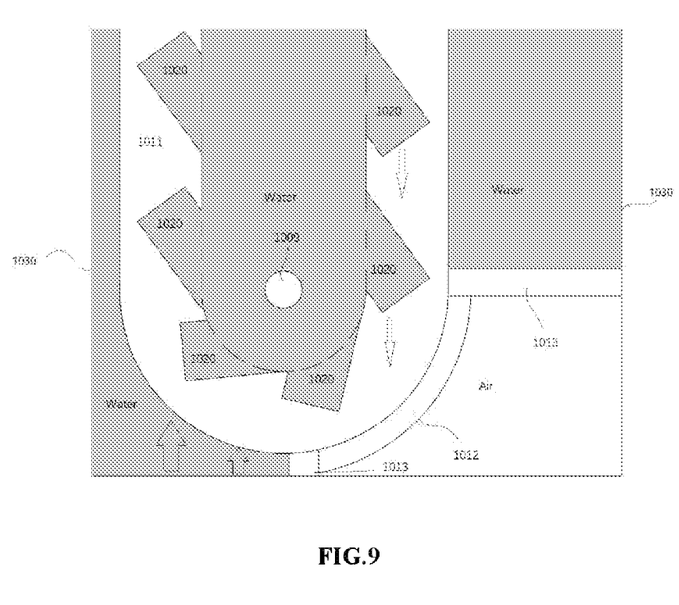
FIG. 9 illustrates a schematic diagram of an opening on the inner surface of the rotor to sense fluid pressure in accordance with aspects of the present technology.

FIG. 9 illustrates a schematic diagram of an opening on the inner surface of the rotor to sense fluid pressure in accordance with aspects of the present technology. In certain embodiments, the rotor 1011 is configured with inner surface openings through which water enters the fluid chamber 1020. The water in the fluid chamber 1020 on both sides of the rotor generates gravitational potential energy and buoyancy potential energy respectively due to the effect of shielding device 1012. Therefore, the gravitational potential energy and buoyancy potential energy will be converted into rotating torque to drive the turbine engine to rotate. 1030 is the container.

Figure 10:
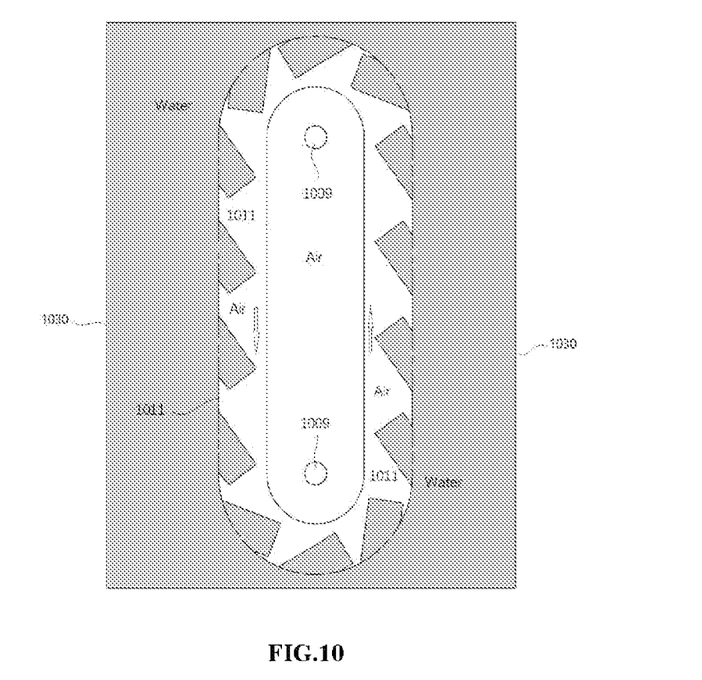
FIG. 10 illustrates a schematic diagram of the inner surface of a rotor entirely shielded by a shielding device in accordance with aspects of the present technology.

FIG. 10 illustrates a schematic diagram of the inner surface of a rotor entirely shielded by a shielding device in accordance with aspects of the present technology. In certain embodiments, shielding means (not shown) are disposed on the end surfaces of the two sides of the rotor 1011 such that the inner surface of the rotor 1011 forms a fluid-free space, thereby effecting gravity of the fluid chamber 1020 relative to the shaft 1009, respectively. The effect of potential energy and buoyancy potential energy. 1030 is the container.

Figure 11:
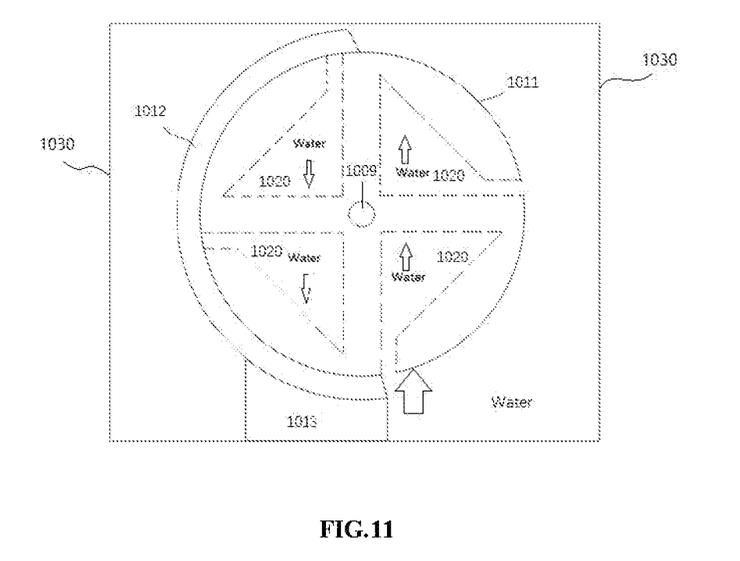
FIG. 11 illustrates a schematic diagram of one side of a rotor completely shielded by a shielding device in according to aspects of this technology.

FIG. 11 illustrates a schematic diagram of one side of a rotor completely shielded by a shielding device in according to aspects of this technology. In certain embodiments, the turbine engine is configured as a cylindrical rotor 1011 mounted on a shaft 1009 that is mounted to the vessel. The turbine engine further comprises a shielding device 1012 mounted on the bracket 1013 that shields the surface of all of the rotors 1011 on the left of the shaft 1009. 1030 is the container.

Figure 12:
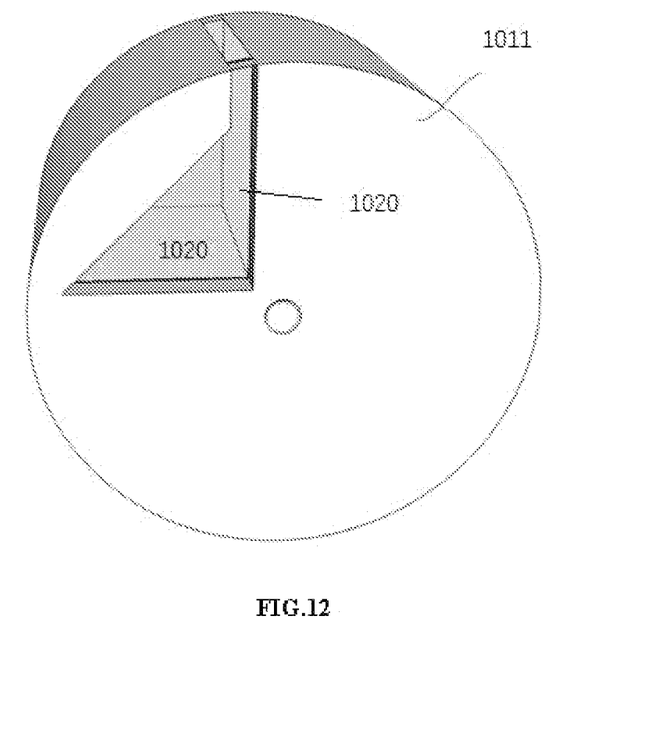
FIG. 12 is a schematic diagram illustrating the internal structure of the rotor in FIG. 10.

FIG. 12 is a schematic diagram illustrating the internal structure of the rotor in FIG. 10. The interior of the rotor 1011 comprises four fluid chambers 1020 through which water enters.

Two fluid chambers 1020 located on the left side of the shaft 1009: since the rotor 1011 on this side is not subjected to the buoyancy of water. As a result, water produces a "object gravity" in the fluid chamber 1020, therefore, the water in the two fluid chambers 1020 generates a gravitational torque based on the shaft 1009;

Two fluid chambers 1020 on the right side of 1009: since the rotor 1011 and the two fluid chambers 1020 are subjected to the buoyancy of water. As a result, the water generates buoyant torque on the two fluid chambers 1020 based on the shaft 1009;

Therefore, the gravitational torque and buoyant torque of the fluid will be converted into rotational torque based on the shaft 1009 to drive the turbine engine to start rotating.

Figure 13:
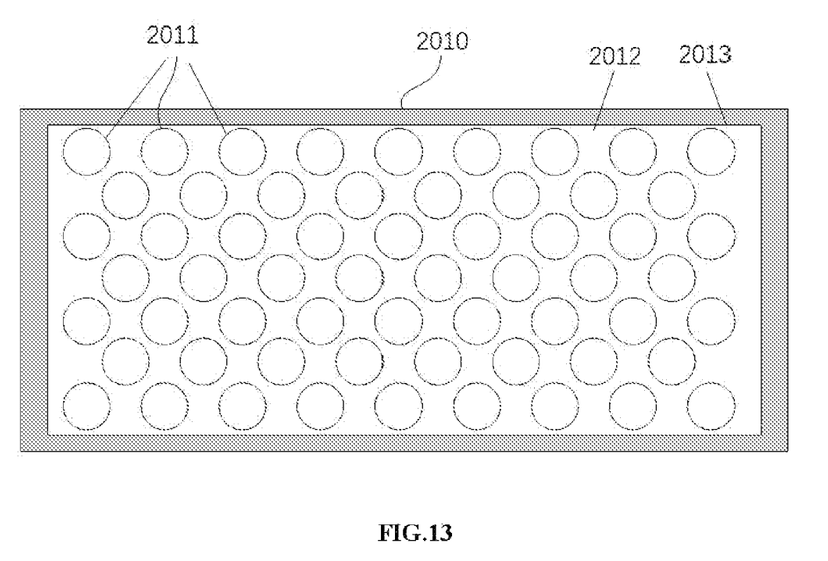
FIG. 13 illustrates a schematic diagram of a shielding device.

FIG. 13 illustrates a schematic diagram of a shielding device. The shielding device 2012 comprises a shielding substrate 2010. The shielding substrate 2010 comprises moving parts 2011 (e.g. spherical rolling parts), sealing part (e.g. silicone rubber strips) 2013 and lubricants (not shown).

Figure 14:
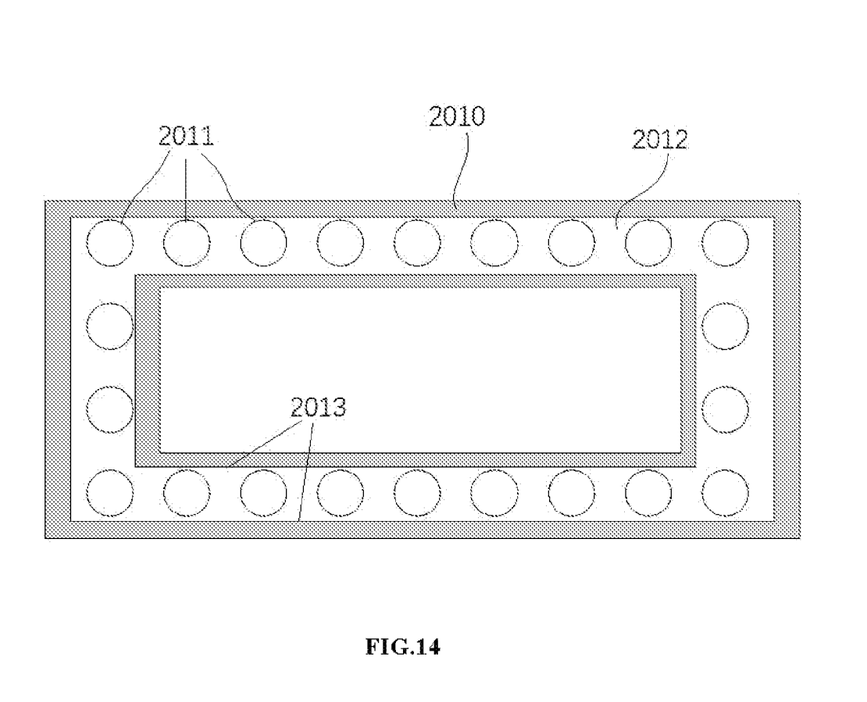
FIG. 14 illustrates a schematic diagram of structural variation of shielding device in FIG. 13.

FIG. 14 illustrates a schematic diagram of structural variation of shielding device in FIG. 13. The shield substrate 2010 is configured to be hollow in the middle to reduce the surface contact with the moving parts. The shielding substrate 2010 comprises a rotating part 2011, a sealing part 2013, and a lubricating oil (not shown). The shielding substrate 2010 may be a material such as surfacing cobalt chromium tungsten/cast iron/impregnated graphite/bronze/phenolic plastic, but is not limited thereto.

It is, therefore, to be understood that a turbine fluid power generator, comprising: a plurality of objects or fluid chambers mounted on the interior of a rotor, the rotor drivingly coupled to an electrical generator; the supporting and rolling system are consisted of a plurality of shafts and bearings on the surface of the annular guideway and is configured on the annular guideway to support the volume and shape of the rotor; an annular guideway fixed to the bracket to determine the cyclic rotation of the rotor; a shielding device fixed to the bracket and configured to shield a unidirectional fluid pressure at a distance required by the turbine fluid power generator on one side of the shaft; an object or a fluid chamber is configured to sense the change of fluid pressure, determine potential energy and moment based on the dynamic position between the shielding device and the rotor in response to the sensed change in fluid pressure, and superimpose the potential energy and torque on the shaft to obtain a collective blade rotor torque; the shielding device is fixed on the support and is configured to shield the one-direction fluid pressure at the distance required by the turbine fluid power generator on one side of the shaft.

It is, therefore, to be understood that a turbine fluid power generator, further comprising: a rotating disk/a rotor with a belt shape, the inside structure is configured as a space and a plurality of objects or fluid chambers are mounted for sensing fluid pressure; wherein there are springs or support frames or support rods to support the internal space of the rotor; a support-guideway system is configured on the bracket for use as a rotor motion track; a shielding device is configured on the bracket to shield a fluid pressure at the desired position of the rotor; and the object in the rotor obtains hydrodynamics torque based on the shaft of the turbine engine, and rotor responds to the sensed change in fluid pressure and coupling the torque of all objects in the rotors at the dynamic position to the shaft to obtain a total torque of rotation based on all the rotors; wherein there are a plurality of shafts on the rotor, and bearings are mounted on the two ends of the shaft; said fluid can be water or artificial liquid.

It is, therefore, to be understood that a method for driving a turbine engine by fluid pressure comprising: constructing a space and object within a rotor to obtain potential energy; determining a location of shielding fluid device based upon the fluid pressure required by the shaft and rotor of turbine engine; determining the location of objects based upon hydrodynamic torque of shaft of the turbine engine, in response to the sensed fluid pressure, and coupling the torque of all objects in the rotor at the dynamic position to the shaft to obtain a total rotational torque based upon the entire rotor; and installing the said turbine engine at the bottom of a vessel to obtain maximum fluid pressure; wherein sensing fluid pressure is through a rotor with a rotating disk/bell-shaped object; sensing fluid pressure comprises sensing fluid pressure direction at least one specific portion of rotor based upon contribution of that section to dynamics torque on the inner of rotor; the inside of the rotor can be configured as a fluid chamber or object; the cross-sectional shape of rotor is polygon/triangle/arc; a support-guideway system is installed on a container, determining the rotor motion pattern based upon the shape of the support-guideway system; there are shafts and bearings on the rotor; the use of rotation of a fluid drives the rotor motion; increasing hydrodynamic torque via increasing the height of the fluid; determining the dynamics moment of the object is based upon the height of the internal space of the rotor; there is an opening on the surface of the rotor through which the fluid enters the fluid chamber; the support-guideway system comprises a baffle or a radiation shaft; said fluid can be water or artificial liquid.

It is, therefore, to be understood that a shielding device, comprising: a shielding substrate arranged on the bracket in close contact with the moving member to shield the fluid; rotating the original piece configured to be installed on the shielded substrate to reduce friction between the moving component and the shielded substrate; and a shielding device which is arranged on the shielded substrate in close contact with the moving member to shield the fluid. The elastic sealing element is arranged on the shielded substrate; and will have a certain hardness of grease covering the shielded substrate to rotate the original piece, the clearance of the elastic sealing element to prevent the inflow of the fluid.

It is, therefore, to be understood that a shielding device, further comprising: determining the shape of a shielding substrate to shield the fluid based upon the surface shape of the moving component at where the fluid needs to be shielded; determining a the material of surface of rotating component based on the shielding substrate to reduce friction between the moving component and the shield substrate; a sealing component is determined based upon the rotating component or the shielding substrate, and the lubricant is applied to the shield substrate to prevent the inflow of fluid; wherein the shielding substrate or sealing element is a self-lubricating material or an elastic material or a nano material, but is not limited thereto; the rotating parts are spherical transfer parts/pulleys/bearings, but is not limited thereto; shielding fluid pressure is achieved only through the shield substrate; said fluid can be water or artificial liquid.

It is, therefore, to be understood that an energy conversion device for converting fluid pressure energy into mechanical energy, comprising: a container filled with fluid; a first inclined support-guideway system having a racetrack; a second inclined support-guideway system having a racetrack, being in parallel to the first inclined support-guideway system and being opposed to the first support-guideway system; a first shaft with turntable; a second shaft with turntable; a shielding device, comprising: at least one rotating element and lubricant are arranged to a shielding substrate, the elastic sealing element surrounds the shielding substrate, the shielding device is fixed on the support-guideway system; a transmission device, comprising: a rotor is connected to the first shaft with turntable and the second shaft with turntable so that the rotor rotates on it, and the rotor and the shielding device form a dynamic seal to block the fluid pressure, at least one first fluid chamber attached to and located above the inner cavity of the rotor, at least one second fluid chamber attached to and located below the inner cavity of the rotor, a plurality of shafts attached to the rotor, wherein the first inclined support-guideway system and the second inclined support-guideway system are separated by the rotor, each shaft has two bearing on each end of the shaft and the two bearing are disposed into one of the support-guideway system having a racetrack so that the transmission device rotates along the first inclined support-guideway system having a racetrack and the second inclined support-guideway system having a racetrack; and an energy output shaft attached to and rotating with the rotor, wherein each end of the energy output shaft has a bearing that the bearing is arranged on the side of the support-guideway system to guide the rotor; wherein the upper part of the rotor shields the pressure of the fluid on the at least one first fluid chamber from the bottom using shielding device so that the at least one first fluid chamber is moveable under the gravity force in a downward direction, and the lower part of the rotor is subjected to the pressure of the fluid on the at least one second fluid chamber so that the at least one second fluid chamber is movable under the buoyance force in an upward direction, thereby the at least the first fluid chamber and at least one second fluid chamber rotating along the first inclined support-guideway system and the second inclined support-guideway system and the energy conversion device outputting energy through the energy output shaft; wherein the fluid chamber with an opening is fixed to the surface of the rotor to receive fluid; the upper part of the rotor is subject to the gravity of the fluid to push the rotor moving downwards; and the lower part of the rotor is subject to the upward pressure of fluid to drive the lower part of the rotor moving upward; the inner cavity of the rotor is a space with air; the fluid in the fluid chamber rotates in the inner cavity of the rotor; the fluid can be water or artificial liquid.

The above-described techniques thus facilitate optimum use of turbine engine. For example, the shape and installation angle of the rotor 1011; for example, the structure and shape of the shielding device 2012, as well as the location of the installation and the number of installations, may be determined by reference to the size of the container or the environmental conditions used. For example, the shielding substrate 2010 may have a surface shape or structure that may be determined with reference to the shape or structure of the moving part, and the rotating part may be determined based on the material of the shielding substrate and the rotor surface to reduce the friction between the moving part and the shielding substrate. The shielding device 2012 can be a shielding substrate 2010 with special material nature, however, it is better to use sealing part 2013 and grease with certain hardness to cover the shielding substrate than the shielding device with only shielding substrate 2010.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An energy conversion device for converting fluid pressure energy into mechanical energy, comprising:
   a container filled with fluid;
   a first inclined support-guideway system having a racetrack;

a second inclined support-guideway system having a racetrack, being in parallel to the first inclined support-guideway system and being opposed to the first support-guideway system;
a first shaft with turntable;
a second shaft with turntable;
a shielding device, comprising:
  at least one rotating element and lubricant are arranged to a shielding substrate; the elastic sealing element surrounds the shielding substrate; the shielding device is fixed on the support-guideway system;
a transmission device comprising:
  a rotor is connected to the first shaft with turntable and the second shaft with turntable so that the rotor rotates on it, and the rotor and the shielding device form a dynamic seal to block, the fluid pressure;
  at least one first fluid chamber attached to and located above the inner cavity of the rotor;
  at least one second fluid chamber attached to and located below the inner cavity of the rotor;
  a plurality of shafts attached to the rotor, wherein the first inclined support-guideway system and the second inclined support-guideway system are separated by the rotor; each shaft has two bearing on each end of the shaft and the two bearing are disposed into one of the support-guideway system having a racetrack so that the transmission device rotates along the first inclined support-guideway system having a racetrack and the second inclined support-guideway system having a racetrack; and
  an energy output shaft attached to and rotating with the rotor, wherein each end of the energy output shaft has a bearing that the bearing is arranged on the side of the support-guideway system to guide the rotor;
wherein the upper part of the rotor shields the pressure of the fluid on the at least one first fluid chamber from the bottom using shielding device so that the at least one first fluid chamber is moveable under the gravity force in a downward direction, and the lower part of the rotor is subjected to the pressure of the fluid on the at least one second fluid chamber so that the at least one second fluid chamber is movable under the buoyance force in an upward direction, thereby the at least the first fluid chamber and at least one second fluid chamber rotating along the first inclined support-guideway system and the second inclined support-guideway system and the energy conversion device outputting energy through the energy output shaft.

2. The energy conversion device for converting fluid pressure energy into mechanical energy in the fluid according to claim 1, wherein the fluid chamber with an opening is fixed to the surface of the rotor to receive fluid.

3. The energy conversion device for converting fluid pressure energy into mechanical energy in the fluid according to claim 1, the upper part of the rotor is subject to the gravity of the fluid to push the rotor moving downwards; and the lower part of the rotor is subject to the upward pressure of fluid to drive the lower part of the rotor moving upward.

4. The energy conversion device for converting fluid pressure energy into mechanical energy in the fluid according to claim 1, the inner cavity of the rotor is a space with air.

5. The energy conversion device for converting fluid pressure energy into mechanical energy in the fluid according to claim 1, the fluid in the fluid chamber rotates in the inner cavity of the rotor.

6. The energy conversion device for converting fluid pressure energy into mechanical energy in the fluid according to claim 1, the fluid can be water or artificial liquid.

* * * * *